United States Patent [19]

Martinmaas

[11] 3,760,895
[45] Sept. 25, 1973

[54] STEERING APPARATUS FOR A SELF-PROPELLED VEHICLE

[76] Inventor: Werner W. Martinmaas, 835-10th Ave., N.W., Watertown, S. Dak. 57201

[22] Filed: Dec. 27, 1971

[21] Appl. No.: 212,067

[52] U.S. Cl. .............................. 180/5 R, 280/21 A
[51] Int. Cl. .............................................. B62m 27/02
[58] Field of Search ........................... 280/21 A, 16; 180/3–6

[56] References Cited
UNITED STATES PATENTS

| | | | |
|---|---|---|---|
| 3,650,341 | 3/1972 | Asmussen | 180/5 R |
| 3,504,752 | 4/1970 | Milward | 180/5 R |
| 2,905,479 | 9/1959 | Schomers | 280/16 |
| 3,682,495 | 8/1972 | Zaimi | 280/21 A X |
| 3,550,706 | 12/1970 | Watkins | 180/5 R |
| 2,700,427 | 1/1955 | Schomers | 180/3 R |
| 3,361,436 | 1/1968 | Williams | 280/16 |

FOREIGN PATENTS OR APPLICATIONS

| | | | |
|---|---|---|---|
| 1,032,750 | 4/1953 | France | 280/21 A |
| 547,297 | 9/1922 | France | 280/21 R |

Primary Examiner—Richard J. Johnson
Attorney—John D. Gould et al.

[57] ABSTRACT

A self-propelled vehicle having a pair of supporting skis which are dirigible for steering the vehicle. The vehicle has control apparatus for imparting steering movement to the skis as well as pivotal or tilting movements to the skis on generally horizontal axes extending longitudinally of the skis, the tilting movements being relative to the vehicle frame structure.

9 Claims, 5 Drawing Figures

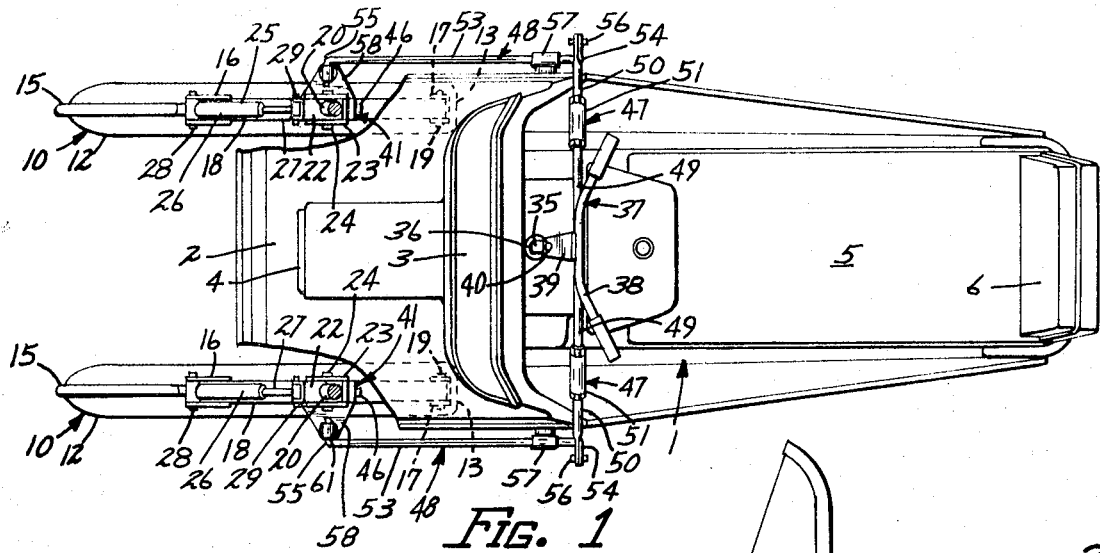
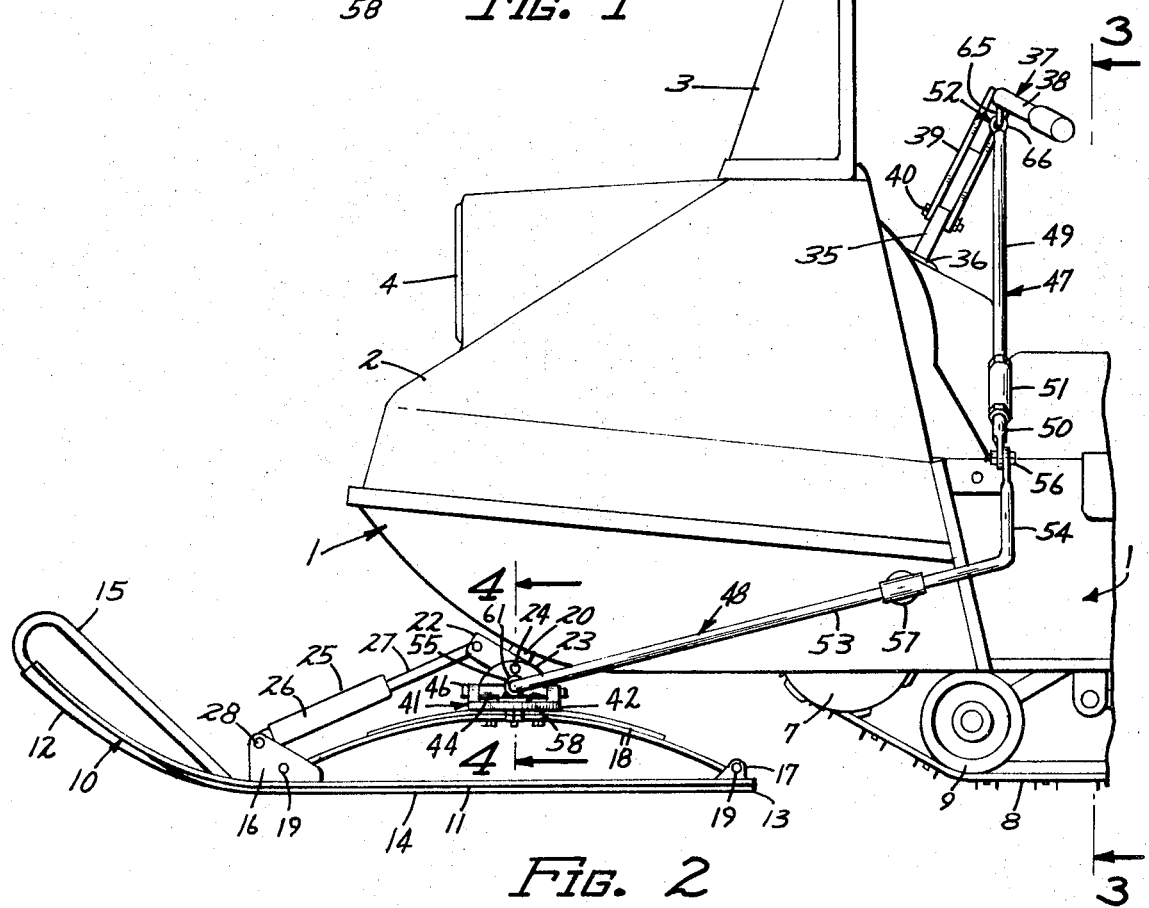

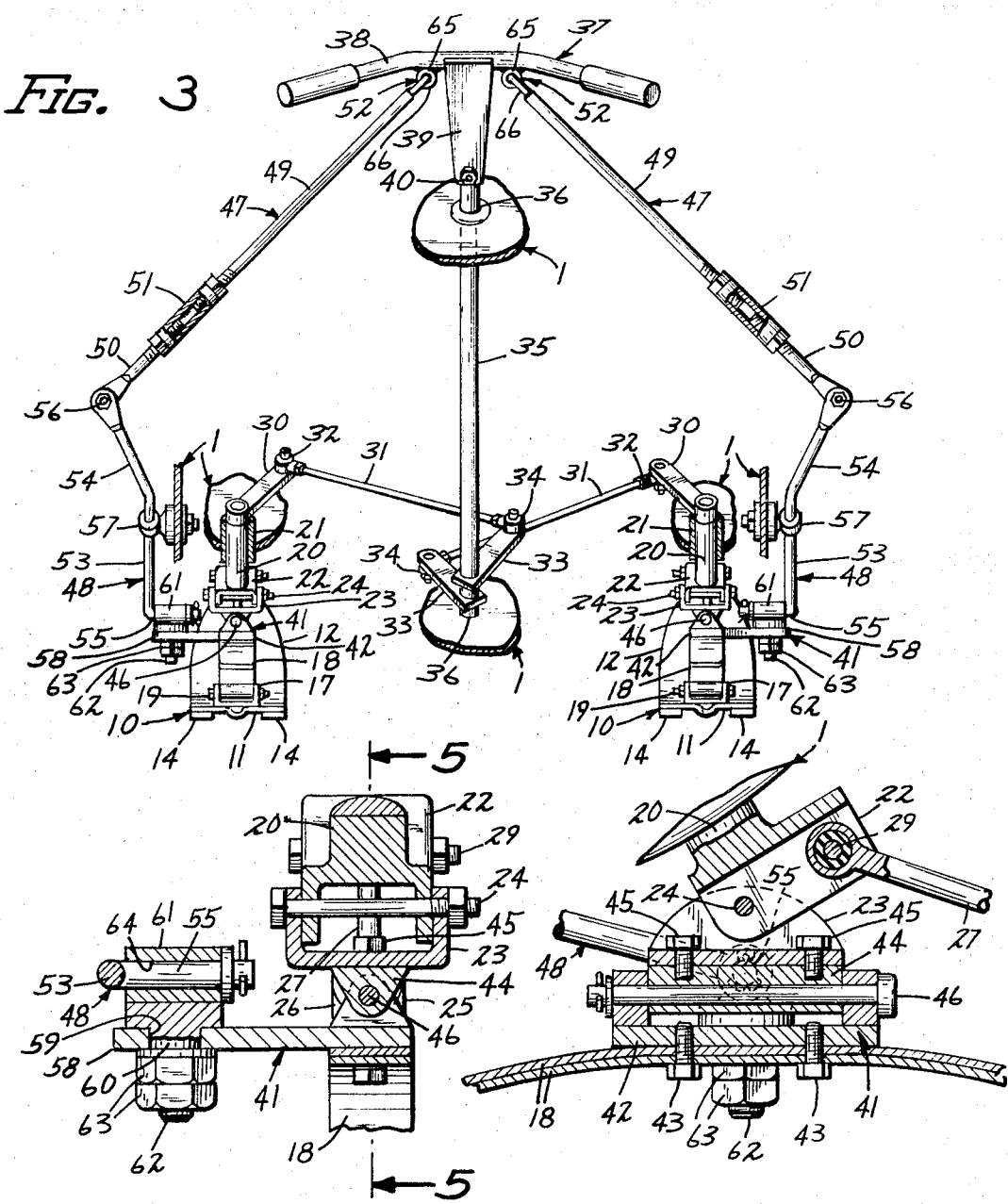

3,760,895

STEERING APPARATUS FOR A SELF-PROPELLED VEHICLE

BACKGROUND OF THE INVENTION

Ski equipped vehicles, such as snowmobiles, are well known, these usually being supported in part and driven by endless flexible drive belts or tracks underlying at least the rear portion of the vehicle frames or bodies. The front ends are usually supported by a pair of laterally spaced dirigible skis whereby directional control is had over the vehicles. Usually, making turns in snow is not highly satisfactory due to the fact that the skis tend to skid laterally unless they are equipped with keels. When thus equipped, they are difficult to turn, and offer somewhat greater resistance to forward travel than do unkeeled skis. The value of tilting the skis has been recognized, as illustrated in such prior U. S. Letters Patent as Nos. 2,532,887; 2,700,427; 2,905,479; and 3,173,703.

SUMMARY OF THE INVENTION

An important object of this invention is the provision of a ski equipped vehicle, such as a snowmobile or watercraft, which is substantially more stable and more maneuverable than heretofore.

Another object of this invention is the provision of a ski equipped vehicle which can be rendered more maneuverable and stable at relatively low cost.

In the accomplishment of the above objectives, I provide a self-propelled vehicle including a frame structure, means for propelling the vehicle, a pair of skis mounted on steering spindles for supporting a portion of the vehicle and for steering same, and control mechanism for the skis. The skis are each mounted on a steering spindle for common steering rotation therewith, and for tilting movements relative to the vehicle on axes extending longitudinally of the skis. A steering shaft, rotatably mounted in the frame structure, is connected by linkage to the steering spindles to impart steering movements to the skis. A control handle is mounted on the steering shaft for imparting steering movement to the shaft. Control linkage is connected to the control handle and to the skis, the control handle being moveable independently of the steering shaft in a direction to impart pivotal or tilting movements to the skis on the above-mentioned longitudinal axes. Such tilting of the skis when making a turn, causes the skis to more effectively engage the underlying surface, in the same manner as do the skis of a skier when negotiating a turn; to the end that much sharper turns may be safely made than have been heretofore possible.

DESCRIPTION OF THE DRAWINGS

FIG. 1 is a view in plan of a conventional snowmobile with the ski mounting and control mechanism of this invention applied thereto, some parts being broken away and some parts being shown in section;

FIG. 2 is an enlarged fragmentary view in side elevation of the front end portion of the vehicle of FIG. 1;

FIG. 3 is a transverse section taken on the line 3—3 of FIG. 2, some parts being broken away;

FIG. 4 is an enlarged fragmentary section taken on the line 4—4 of FIG. 2; and

FIG. 5 is a fragmentary section taken on the line 5—5 of FIG. 4.

DETAILED DESCRIPTION OF THE PREFERRED EMBODIMENT

A self-propelled vehicle in the nature of a conventional snowmobile is shown in the drawings as comprising an elongated body or frame structure indicated generally at 1, the same defining a hood 2 at the front end portion thereof which carries a windshield 3 and a conventional head lamp 4. An elongated seat element 5 is disposed rearwardly of the hood 2 and windshield 3, and is equiped with a back rest 6. As is customary, the hood 2 encloses a drive motor and transmission mechanism, not shown, the drive mechanism including a drive pulley partially shown in FIG. 2 and indicated at 7. An endless flexible drive belt 8 is entrained over the pulley 7 and an idler pulley, not shown, but which may be assumed to underly the rear-end portion of the frame structure or body 1, in the usual manner. The vehicle is supported from the drive track or belt 8 in the usual manner by means of bogey wheels or the like, one of which is shown in FIG. 2 and indicated by the reference numeral 9.

The vehicle is supported at its front end and steered by a pair of laterally spaced skis 10 of well-known commercially available construction each defining a bottom planing surface 11 having an upwardly curving front end portion 12 and a rear end 13. In the embodiment illustrated, each of the skis 10 is further provided with longitudinally extending ribs 14 which partially define the bottom planing surfaces 11. Also as is customary, the skis 10 are provided at their front end portions with brace members or the like 15. Longitudinally spaced front end rear anchoring brackets 16 and 17 respectively are secured to the skis 10, and have connected thereto the opposite ends of leaf springs 18, by nut equiped bolts or similar fasteners 19.

The skis 10 are mounted in supporting and steering relationship to the frame structure or body 1 by means of a pair of laterally spaced parallel steering spindles 20 that are journalled in bearings 21 suitably mounted in the frame structure 1. At its lower end, each spindle 20 is provided with a channel-shaped foot element 22 to which is pivotally secured an upwardly opening channel-shaped shoe 23, by means of a pivot pin or the like 24. The pivot pin or bolts 24 are disposed on generally horizontal axes extending transversely of the direction of travel of the vehicle and transversely of the longitudinal dimension of their respective skis 10. A pair of hydraulic shock absorbers 25 are connected between each anchoring bracket 16 and its respective foot element 22, the shock absorbers 25 comprising elongated cylinders 26 and cooperating piston equipPed plunger rods 27, the former of which are pivotally connected to the anchoring bracket 16, as indicated at 28, the latter having outer ends pivotally connected their respective foot elements 22, by not equipped screws or the like 29.

In the normal snowmobile supporting and steering arrangement, the shoes 23 are bolted directly on to the intermediate portions of the leaf springs 18, so that the skis 10 may partake of swinging movements in a generally vertical plane longitudinally of the skis 10 and about the axis of the pivot bolts 24, as well as steering movements on the axes of the steering spindles 20. It will here be noted that each steering spindle 20 has rigidly secured to its upper end a crank arm 30. At the outer end of each crank arm 30 is pivotally connected the outer end of a different one of a pair of pitman arms 31, as indicated at 32. The inner ends of the pitman arms 31 are pivotally connected one each to the outer end of one of a pair of crank arms 33, as indicated at 34. The inner ends of the crank arms 33 are rigidly secured to a rotary steering shaft 35 that is journalled in spaced portions of the frame structure 1, as indicated at 36. Steering movements are imparted to the steering shaft 35 by a control handle 37 comprising a pair of hand grip equiped handle bars 8 and a depending leg portion 39 that Is pivotally secured at its lower end to the upper end of the steering shaft 35, by means of a not equipped pivot screw 40 or similar pivot connection, for common steering movements of the control handle 37 with the steering shaft 35 and for Independent swinging movements of the control handle 37 about the axis of the pivot screw or bolt 40 which extends transverse'y of the steering shaft 35.

For the purpose of mounting the skiS 10 for pivotal or tilting movements relative to the frame structure 1, on an axis extending longitudinally of each ski 10, I provide an adapter 41 for each of the skis 10, each adapter 41 comprising a base member 42 that is rigidly secured to its respective spring 18 by mounting screws or the like 43, and a support member 44 that is rigidly secured to its respective shoe 23 by other screws 45, see particularly FIGS. 4 and 5. As therein shown, the base members 42 and support members 44 are provided with aligned openings for reception of a pivot shaft 46 the axis of which extends longitudinally of Its respectIve ski 10.

Pivotal movements of the skis 10 aout the axes of their respective pivot shafts 46 are controlled by the control handle 37 and by linkage comprising a pair of rigid links 47 and a cooperating pair of levers 48. Each link 47 comprises a pair of aligned link sections 49 and 50 having adjacent lock nut equipped inner end portions that are screw threaded into opposite ends of an internally threaded tubular section 51, whereby the effective lengths of the links 47 may be adjusted. The outer ends of the link sections 47 are pivotally connected to the handle bars 38, adjacent the upper end of the leg 39, as indicated at 52. The levers 48 each comprise an elongated intermediate shaft section 53 and lever arms 54 and 55 the former of which is pivotally connected at its outer end, as at 56, to the adjacent outer end of a respective one of the link sections 50. Each shaft section 53 is axially slidably journalled in one of a pair of bearing elements 57 each pivotally secured to the frame structure 1 at an opposite side of the vehicle. Thus, each lever 48 is supported by the frame structure for universal pivoting an: axial sliding movements relative to the frame structure 1.

Each of the adapter base members 42 is formed to provide a laterally outwardly projecting plate like portion 58 having a generally vertically extended opening 59 therethrough in which is journalled the shank portion 60 of a connecting member 61. Each shank portion 60 is formed to provide a diametrically reduced and threaded end 62 on which is screw threaded washer equipped retaining and stop nuts 63. Further, each connector member 61 has a transverse bore 64 therethrough in which Is journalled a respective one of the lever arms 55, the bores 64 being normal to the axes of the shank portions 60. With this arrangement, the lever arm 55 of each lever 48 is capable of universal pivotal movements relative to its respective base member 42.

It will be noted, with reference to FIGS. 2 and 3 that the pivotal connections 22 comprise inter-engaging rings 65 and 66 on the handle bars 38 and link sections 47 respectively. It will be further noted that the pivot screws 56 provide a relatively loose pivotal connection between the link sections 50 and their respective lever arms 54. This arrangement, together with the pivotal and sliding engagement of the lever shaft sections 53 and their respective pivoted bearings 57 and the universal connection of the lever arms 55 with their respective adapter support members 42, makes possible the tilting of the skIs 10 about the axes of their respective pivot shaft 46 during steering movement of the steering shaft 35. When negotiating a turn, the operater of the vehicle turns the control handle 37 and steering shaft 35 in the desired direction, and at the same time swings the control handle 37 laterally in a direction radially inwardly of the desired turn. In other words, if the operator decides to make a right turn, he rotates the steering shaft 35 in the desired direction and at the same time swings the control handle 37 about the axis of the pivot screw 40 toward the right. This action causes the links 47 to swing their respective levers 48 in a manner to tilt the skis 10, so that the left hand edges thereof move generally upwardly so that the skis can effectively bank during the turn, while the vehicle remains in a vertical position. As the skis bank during the turn, they dig into the underlying surface, such as snow, without appreciable skidding, enabling the vehicle to make a much better controlled turn that heretofore. When the desired turn is not too sharp, the vehicle may be turned by simply swinging the control handle on the axis of the pivot screw 40 in the desired direction.

It will be further appreciated that, while I have shown and described the device of this invention as applied to a snowmobile, that such an arrangement is equally applicable to water born vehicles. While I have shown and described a commercial embodiment of vehicle and control means therefore, it will be understood that the same is capable of modification without departure from the spirit and scope of the invention, as defined in the claims.

What is claimed is:

1. In a self-propelled vehicle including, a frame structure, power means mounted on the frame structure for propelling the vehicle over an underlying surface, a pair of skis each defining a planing surface having an upwardly curving front end portion and a rear end, means including a pair of steering spindles mounted said skis on said frame structure for common steering movements on parallel axes extending in generally upward and downward directions, and a rotary steering shaft journalled in the frame structure, the improvement comprising:

a. a pair of adapters interposed between said skis and their respective steering spindles and mounting said skis for pivotal movements relative to said frame structure on axes extending longitudinally of said skis, b. a control handle mounted on said steering shaft for common steering movements therewith and for independent movements relative to said steering shaft, c. and linkage connecting said control handle to each of said adapters for imparting tilting movements to said skis on said longitudinal axes responseive to said independent movements of the control handle.

2. A self-propelled vehicle comprising:
a. a frame structure;
b. a pair oF skis each defInIng a planing surface having an upwardly curving front end portion and a rear end;
c. means mounting said Skis on said frame structure in laterally spaced generally parallel relationship for pivotal movements relative to said frame structure on generally horizontal axes extending longitudinally of said skis and for common steering movements on parallel axes extending in generally upward and downward directions generally transversely of said skis, and including,
  1. a pair of adapters each operatively connected to a different one of said skis and mounting said skis for said pivotal movement,
  2. a pair of spindles each journalled in said frame structure for said steering movement,
  3. and connecting means connecting each of said spindles to a different one of said adapters;
d. power means mounted on said frame structure for propelling the vehicle over an underlying surface;
e. and control means carried by said frame structure for imparting said pivotal and steering movements to said skis, comprising,
  1. a steering shaft journalled in said frame structure,
  2. means operatively connecting said steering shaft to said spindle,
  3. a control handle,
  4. means mounting said control handle on said steering shaft for common rotation therewith and for independent movements relative to said steering shaft,
  5. and linkage connecting said control handle to said adapters for imparting said pivotal movement to said skis responsive to said independent movements of the control handle.

3. The vehicle according to claim 2 in which said adapters each comprise a base member operatively connected to one of said skis, and a support member pivotally mounted on its respective base member and operatively connected to a respective one of said spindles by said connecting means.

4. The vehicle according to claim 3 in which said connecting means comprises a pair of shoe elements each rigidly connected to a different one of said support members, and a pair of feet one each rigidly secured to a different one of said spindles and each connected to a respective one of said shoe elements.

5. The vehicle according to claim 4 in which said feet are connected to their respective shoe elements for limited pivotal movements of said shoe elements, adapters and skis, relative to said frame structure, on normally generally horizontal axes extending transversely of said skis.

6. The vehicle according to claim 2 in which said means mounting the control handle on said steering shaft comprises a pivot connection between said control handle and steering shaft and having an axis extending transversely of said 7. The vehicle according to claim 6 in which said linkage comprises a pair of rigid links each having an inner end connected to said control handle and an outer end, and lever means pivotally mounted on said frame structure and having spaced portions connected to the outer end of respective ones of said rigid links and to respective ones of said adapters.

8. The vehicle according to claim 7 in which lever each of said adapters comprise a base member operatively connected to a respective one of said skis and a support member pivotally mounted on its respective base member, said lever means comprising a pair of levers each pivotally connected at one end to the outer end of a different one of said rigid links and an opposite end pivotally connected to a different one of said base members.

9. The vehicle according to claim 8 in which each of said levers includes an elongated intermediate portion mounted on said frame structure for universal pivotal and longitudinal sliding movements relative to said frame structure and responsive to steering rotation of said steering shaft and independent movements of said control handle to impart said pivotal movements to said skis.

* * * * *